United States Patent [19]

Edwards

[11] Patent Number: 5,398,860

[45] Date of Patent: Mar. 21, 1995

[54] FASTENER DELIVERY TUBE

[76] Inventor: Cyril K. Edwards, Ariel Works, Temple Road, Leicester, LE5 4JG, United Kingdom

[21] Appl. No.: 49,083

[22] Filed: Apr. 20, 1993

[30] Foreign Application Priority Data

Apr. 21, 1992 [GB] United Kingdom ................. 9208523
Feb. 10, 1993 [GB] United Kingdom ................. 9302653

[51] Int. Cl.⁶ .............................................. B21J 15/32
[52] U.S. Cl. ..................................... 227/149; 227/119
[58] Field of Search ................. 227/119, 149; 29/788, 29/243.53

[56] References Cited

U.S. PATENT DOCUMENTS

| | | | |
|---|---|---|---|
| 2,538,895 | 1/1951 | Brennan | 227/149 X |
| 2,543,942 | 3/1951 | Shaff | 227/149 X |
| 4,201,325 | 5/1980 | Jochum | 227/149 X |
| 4,909,418 | 3/1990 | Cardinale et al. | 227/149 X |
| 4,978,047 | 12/1990 | Chen | 227/149 X |
| 4,995,543 | 2/1991 | Earl | 227/149 X |
| 5,181,315 | 1/1993 | Goodsmith | 227/149 X |

*Primary Examiner*—Rinaldi I. Rada
*Attorney, Agent, or Firm*—Lackenbach Siegel Marzullo, Aronson & Greenspan

[57] ABSTRACT

A fastener delivery tube (21) incorporates an internal guide (22)—such as a continuous sleeve lining, flexible, or resiliently deformable spring strips (34, 37, 38) or re-circulating balls (54)—forming a longitudinally movable constriction, inhibiting fastener free-fall through the tube and preserving fastener orientation, by maintaining fastener (25) contact with a driving plunger (28) in its passage there-through and upon exit there-from into contact with a workpiece.

10 Claims, 5 Drawing Sheets

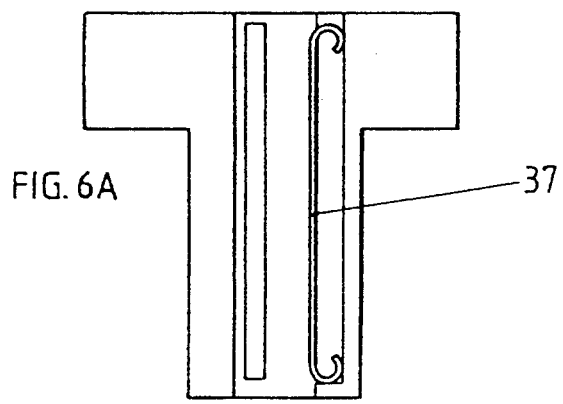
FIG. 6A
FIG. 6B
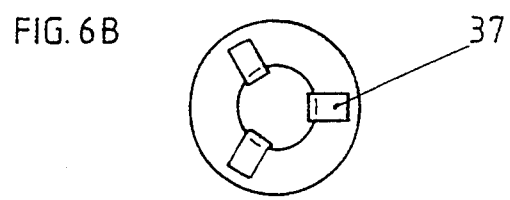
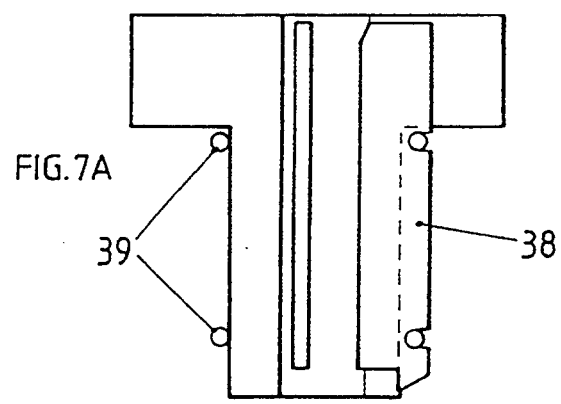
FIG. 7A
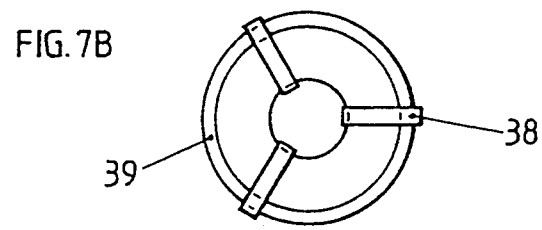
FIG. 7B

FASTENER DELIVERY TUBE

BACKGROUND OF THE INVENTION

1. Field of the Invention

This invention relates to the presentation of fasteners to workpieces. More specifically, it relates to fasteners which are to be machine applied and need to be fed, through a delivery tube, from a supply, such as a carrier tape, to a remote workpiece—often with restricted access.

2. Description of the Prior Art

It has been found desirable to provide such a delivery tube with the capability of exerting a controlled restraining force, sufficient to hold the fasteners in a desired orientation throughout their passage through the tube—but preferably without marking the fastener body.

The term tube is used herein to embrace any configuration or disposition of chamber, enclosure or passageway.

The term fastener is used herein to embrace a disparate variety of elements for joining one component to another.

Of the generality of fasteners, the invention is particularly, but not exclusively, concerned with rivets—for example hollow, tubular, self-piercing rivets, with a shank and relatively enlarged head.

Fasteners, such as rivets, which are short (along their fastening axis) in relation to their girth, present special handling and delivery problems—not least because of their innate tendency to tumble, or lose their axial orientation with respect to the direction of (delivery) movement.

A typical applicator for applying fasteners consists of a hydraulic cylinder carrying a fastener driving plunger mounted on a 'C'—frame.

Fasteners, carried in a tape, are fed in synchronism with the cylinder operation, and are guided over the workpiece through a replaceable nozzle.

Diverse mechanisms have been developed previously to ensure that machine applied fasteners arrive at the workpiece in the correct orientation.

Where it is possible to introduce a guidance tool (as in the case of, say, spring pilot anvils, which are used to guide semi-tubular rivets into position), or where the fastener has adequate bearing surfaces along its major diameter, the guidance is generally not unduly problematic.

However, where it is not possible to introduce a guidance tool and where the contact or bearing surface is limited (as for instance with a fastener with a countersunk head), or where the length of the fastener is small relative to its (head) diameter, the problems of ensuring accurate presentation are more acute.

This is particularly so where the application requirements are such that the delivery tube cannot be maintained in a vertical orientation—i.e. absent reliance upon a gravity feed.

SUMMARY OF THE INVENTION

It has been found that, in circumstances where it is not possible to use a guidance tool, and where the fastener has an inadequate bearing surface on its major diameter, or where the length of the fastener is small relative to its diameter, it is often advisable to restrain the fastener during its passage through the delivery tube by exerting a restraining or gripping action or force sufficient to prevent any movement of the fastener under its own weight.

It has been found that the necessary restraining or gripping force can be generated by providing the delivery tube with a temporary or movable localised 'constriction'—i.e. a free internal diameter less than the major diameter of the fastener which is to pass through it.

More particularly, by contriving that such a constriction moves longitudinally of the delivery tube, co-operatively in conjunction with fastener movement through the tube, both fastener free-fall can be restrained and a desired fastener orientation preserved.

Thus, for example the delivery tube can be lined selectively with a flexible material to provide an interference fit on the major diameter of the fastener.

A continuous internal sleeve provides a restraining force around the whole periphery of the fastener.

However, satisfactory performance has also been achieved when the restraining force is applied by limited segments of the internal circumference of the delivery tube running longitudinally of, and parallel to axis of, the tube.

Consistently successful results have been achieved by applying the restraining force with only three circumferentially-spaced, narrow, or slender, axial strips, disposed longitudinally within the tube.

It has also been found that the restraining force can be successfully applied by deploying internally and longitudinally of the delivery tube strips of spring material or mounted strips of spring-loaded rigid, or semi-rigid material.

An alternative method of providing a restraining force is by the use of ball bearings—which are free to recirculate within closed loops within the wall around the delivery tube.

The balls are free to move with the fastener under pressure from the plunger—and, as they approach the outlet end of the tube, they flow into a return track which allows them continuously to recirculate.

The loops are so arranged that on one leg the balls protrude partly into the delivery tube.

Ideally, the loops are allowed to protrude far enough to contact the shank of the fastener—but, where this is not possible, the minimum requirement is that they protrude far enough to engage a fastener head.

A loop is so designed that its length is greater than the sum of the diameters of the ball bearings, to allow free space for the head of the fastener to take up a position between the ball bearings.

Individual fastener position can be very closely controlled by three such loops (symmetrically) spaced around the delivery tube internal circumference.

The restraining force which the balls can apply to a fastener can be controlled, by ensuring that they are brought into contact with a friction pad, disposed so that all the balls in the loop have to pass by it in the course of a complete revolution or passage around a loop.

A fastener driving plunger can be grooved along its length, so that it does not displace the balls when it pushes a fastener through the tube.

Alternatively, if it is desirable to retain the full diameter of the plunger for a short distance along its length, the free space between the bells can be increased to allow for this.

In each case the requirement is that the restraining force shall be adequate to hold the fastener—so that it cannot move under its own weight and will retain its position within the delivery tube regardless of the orientation of the delivery tube, until it is propelled along the tube by a plunger.

According to one aspect of the invention there is provided a delivery tube for a fastener application machine, for transferring fasteners with a shank and relatively enlarged head, discretely in succession, from a supply, such as a carder tape, to a fastening station, at which fasteners are applied to a workpiece, by a driving head of a fastener application plunger, movable internally of the delivery tube, the delivery tube incorporating a guide, to bear upon a fastener in its transit through the delivery tube, by forming a local passage constriction, movable longitudinally of the tube, co-operatively in conjunction with fastener movement, to restrain the fastener head from free-fall there-through, and preserve a desired fastener orientation within the guide.

Thus the guide may comprise a continuous internal sleeve lining.

Alternatively, the guide may comprise a plurality of longitudinally-extending guide elements, co-operatively disposed in a circumferentially-spaced array, to bear continuously upon a fastener, in its transit through the guide.

In yet another variant, the guide comprises a plurality of circumferentially-spaced, flexible or resiliently-deformable, inwardly-intruding strips.

Yet again the guide may comprise a plurality of circumferentially-spaced, rigid, or semi-rigid strips, spring-biassed inwardly.

In still further variants, the guide may comprise a plurality of circumferentially-spaced, continuously-recirculating ball bearing assemblies, each with a looped track, providing fastener contact balls, during fastener transit through the guide.

One particular guide configuration relies upon an array of three symmetrically-disposed guide members.

The invention embraces a delivery tube of the kind set out above, co-operatively disposed with a fastener carrier tape, incorporating a plurality of individual fastener retention holes, each with a profiled periphery, to produce a predetermined mode of tape deformation, for controlled fastener discharge, through depending tape flaps, directed into a funnel shaped array, to lie co-operatively within the mouth of the delivery tube, and thereby to preserve a desired fastener orientation, upon controlled discharge from the tape and tube entry.

The invention also embraces a fastener installation machine incorporating a fastener delivery tube as set out above.

There now follows a description of some particular embodiments of the invention, by way of example only, with reference to the accompanying diagrammatic and schematic drawings, in which:

BRIEF DESCRIPTION OF THE DRAWINGS

FIGS. 6A and 6B shows two views of a delivery tube with an alternative lining to that of FIGS. 3, 4 and 5;

FIGS. 7A and 7B shows two views of a delivery tube with yet another alternative lining to that of FIGS. 3, 4, 5 or 6;

DESCRIPTION OF THE PREFERRED EMBODIMENTS

Figure 1:
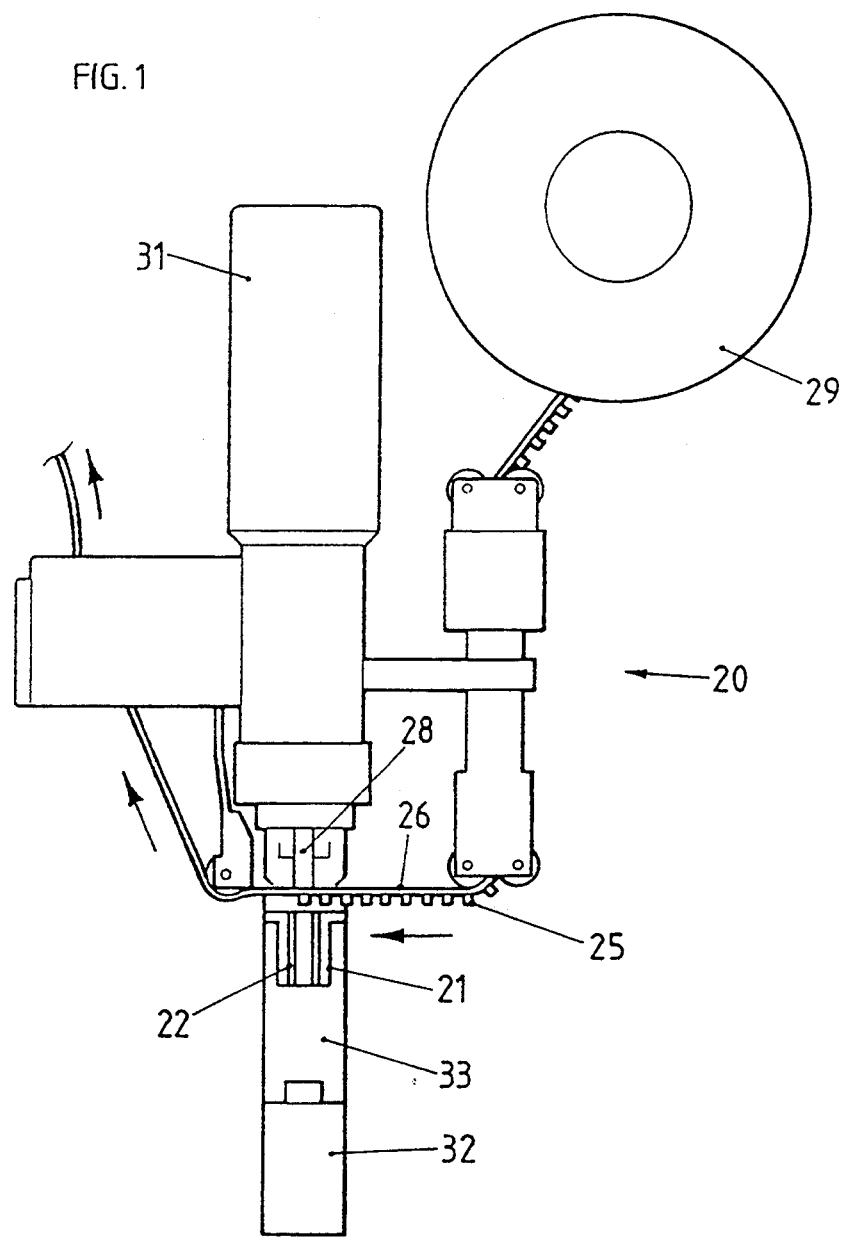
FIG. 1 shows the general overall configuration of a typical applicator and highlights the position of the delivery tube.

Referring to the drawings, and in particular FIG. 1, a fastener applicator 20 has a fluid-actuated ram 31, with a movable piston or plunger driving head 28 for contacting the head of an individual fastener 25 and driving the fastener 25 into a workpiece (not shown) mounted in the throat 33 of a C-frame 32.

For repetitive operation, fasteners 25 are transported to the driving plunger 28 as a linear succession in a carder tape 26, typically of flexible synthetic plastics, from a reservoir or supply spool or cartridge 29 to a position underneath the driving plunger 28.

In order to gain access to a workpiece in positions where space is restricted, it is often necessary to release a fastener 25 from the carrier tape at a point remote from the workpiece and to use a delivery tube 21 to convey the fastener 25 to the point of application.

It is with such a delivery tube 21—and the interaction of its internal passage with the external profile of a fastener 25—that the present invention is particularly concerned.

More specifically, in their passage down the delivery tube 21, the fasteners 25 can lose contact with the plunger driving head 28 and become disorientated, or mis-aligned, so that when the workpiece is contacted upon their emergence from the delivery tube 21, they are installed mis-aligned or indeed not properly secured at all.

Fasteners posing particular problem are those whose length is short compared with their girth, since they exhibit no natural self-alignment, as with a relatively long thin fastener.

Short fasteners, especially short, self-piercing tubular rivets with a shank 24 and relatively enlarged head 27 are advantageous for fastening in shallow depth materials to achieve a satisfactory joint, but exhibit a natural tendency to tumble when passed through a delivery tube.

Figure 2:
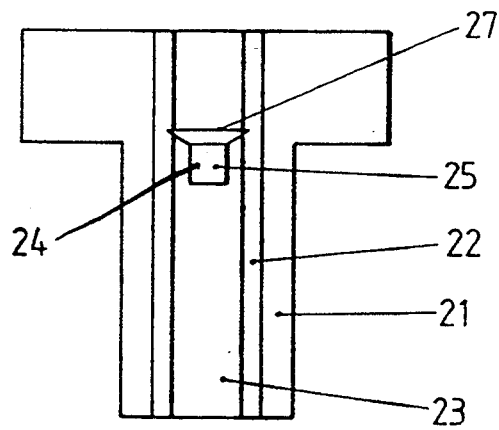
FIG. 2 shows a section of a typical delivery tube lined with a flexible material with a fastener held partially along the tube.
Figure 3:
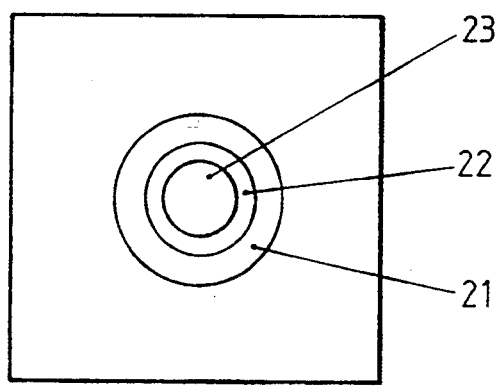
FIG. 3 shows a plan view of the delivery tube of FIG. 2.

In order to combat this effect, FIGS. 2 and 3 show the provision of a simple, continuous tubular lining 22—of resiliently deformable material—within the delivery tube 21 to restrain an individual fastener 25 from free-fall down the tube internal passage 23—whose cross-section is thus constricted thereby.

This restraint is sufficient to preserve contact between the downwardly moving driving head 28 and the head 27 of a fastener 25.

Figure 4:
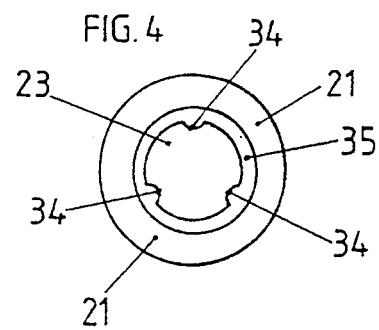
FIGS. 4 and 5 show vertical views of alternative delivery tube linings to that of FIG. 2.

It has been found unnecessary for the lining 22 to be continuous around the inner circumference of the passage 23 and FIG. 4 shows three equi-angularly spaced inwardly projecting fibs 34 on a common sleeve 35.

Figure 5:
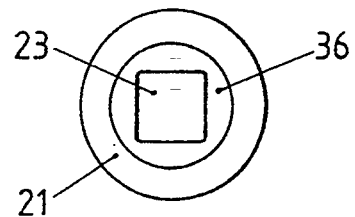

FIG. 5 depicts another intermittent profile for a sleeve lining 36.

The lining 22 could be reduced to slender strips.

Moreover, the lining 22 need not be of flexible material.

Indeed, FIGS. 6A and 6B show a symmetrically-spaced array of inwardly-directed spring strips 37, co-operatively providing a continuous displaceable constriction.

Similarly, FIGS. 7A and 7B show a substitute array of spring-loaded blade segments 38, mutually entrained by spaced 'O'-rings 39, providing the necessary spring restraint and inward bias.

Figure 8:
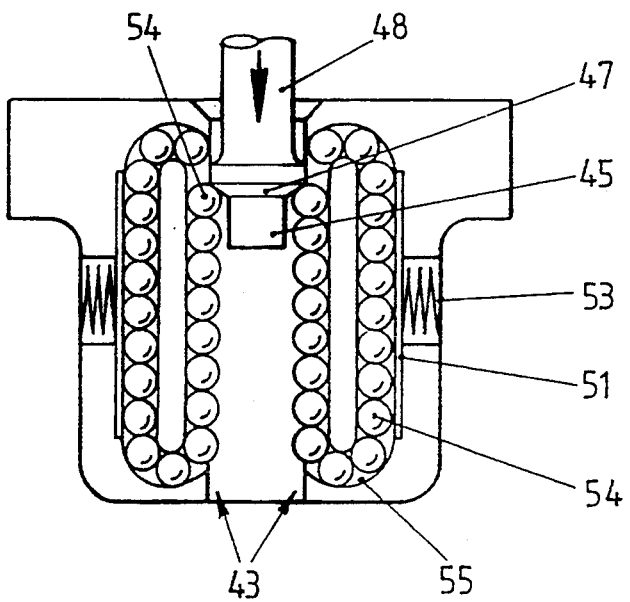
FIG. 8 shows a sectioned view of a typical delivery tube with recirculating loops of ball bearings.
Figure 9:
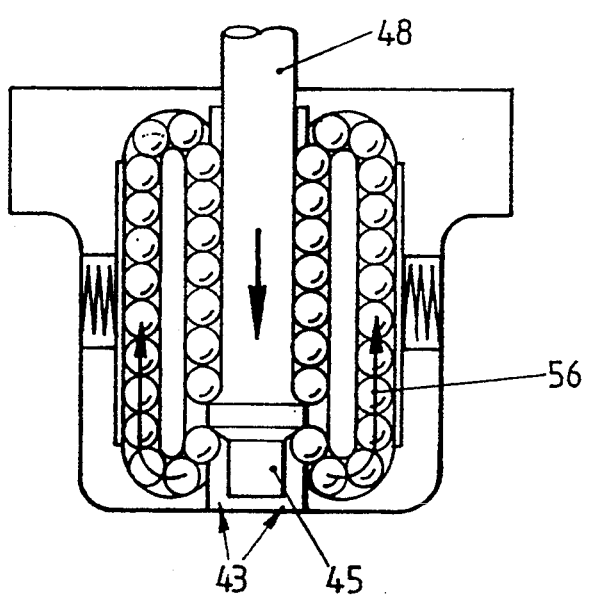
FIG. 9 shows the delivery tube of FIG. 8 at another operational stage.
Figure 10:
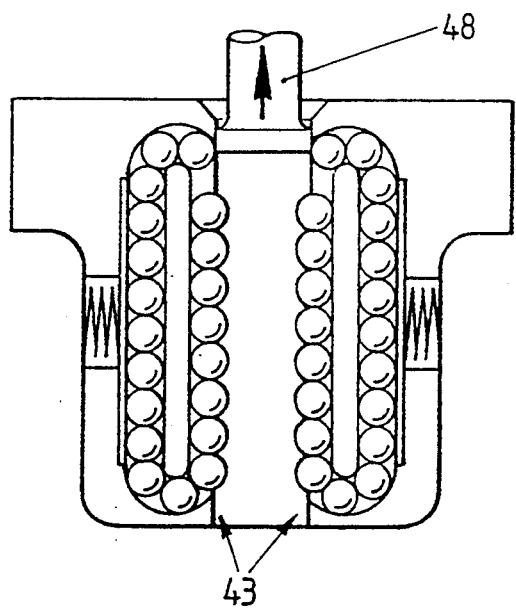
FIG. 10 shows the delivery tube of FIGS. 8 and 9 at another operational stage.

FIGS. 8 through 10 show a more re-active internal passage restraint. Specifically, a rivet 45 is pushed into the delivery tube 43 by plunger 48.

The underside of the head 47 of the rivet 45 rests on a ball 54 from each of three equi-angularly spaced continuous looped tracks or loops 55.

As the plunger 48 pushes the rivet head 47 further into the tube 43, the balls 54 continue to guide the rivit head 47, and thus the rivit 45 as a whole, down the tube 43—and in so doing circulate around the loop 55, as indicated by arrows 56.

The necessary rivet 45 restraining force is applied by inwardly-biassing the balls 54 of each track, by means of a friction pad 51 with an inward-loading spring 53.

I claim:

1. A delivery tube for a fastener application machine for delivering fasteners in succession to a fastening station at which the fasteners are applied to a workpiece, the fasteners each having an elongate shank and a relatively enlarged head having a predetermined cross-sectional dimension and the application machine having a drive which includes a fastener application plunger, the delivery tube comprising a tubular member provided with an internal longitudinal passage defining an internal surface and having a cross-sectional dimension greater than the predetermined cross-sectional dimension of the enlarged head of the fastener when the shank is substantially aligned with the longitudinal direction of said passage; and displaceable guide means extending substantially along the entire longitudinal extent of said internal surface of the delivery tube for rendering the cross-sectional dimension of at least portions of said passage smaller than said predetermined cross-sectional dimension of said enlarged head to form a constriction resulting from an interference fit with the enlarged head of the fastener as the fastener is guided through said passage to restrain a fastener from free fall through said passage and for providing local passage constriction longitudinally movable along the delivery tube in response to a force applied to the fastener head by the plunger for preserving a desired fastener orientation while enabling the fastener to advance and be guided along the delivery tube to the fastening station.

2. A delivery tube as defined in claim 1, wherein said displaceable guide means comprises an internal tubular lining made of a resiliently deformable material.

3. A delivery tube as defined in claim 1, wherein said displaceable guide means comprises a plurality of longitudinally extending guide elements formed of a resiliently deformable material and disposed in a circumferentially-spaced array about said internal surface.

4. A delivery tube as defined in claim 3, wherein said guide elements comprise inwardly projecting ribs formed on an internal tubular sleeve.

5. A delivery tube as defined in claim 1, wherein said displaceable guide means comprises a plurality of circumferentially spaced, resiliently-deformable inwardly-projecting strips.

6. A delivery tube as defined in claim 1, wherein said displaceable guide means comprises a plurality of circumferentially-spaced, rigid or semi-rigid strips, and biassing means for biassing said strips inwardly into said passage.

7. A delivery tube as defined in claim 1, wherein said displaceable guide means comprises a plurality of circumferentially-spaced ball bearing assemblies, looped tracks for said ball bearing assemblies, at least portions of said looped tracks being arranged longitudinally along said passage, and a plurality of fastener head contact ball bearings circulating in said tracks.

8. A delivery tube for a fastener application machine for delivering fasteners in succession to a fastening station at which the fasteners are applied to a workpiece, the fasteners each having an elongate shank and a relatively enlarged head having a predetermined cross-sectional dimension and the application machine having a drive which includes a fastener application plunger, the delivery tube comprising a tubular member provided with an internal longitudinal passage defining an internal surface and having a cross-sectional dimension greater than the predetermined cross-sectional dimension of the enlarged head of the fastener when the shank is substantially aligned with the longitudinal direction of said passage; and displaceable guide means extending substantially along the entire longitudinal extent of said internal surface of the delivery tube for rendering the cross-sectional dimension of at least portions of said passage smaller than said predetermined cross-sectional dimension of said enlarged head to form a constriction resulting from an interference fit with the enlarged head of the fastener as the fastener is guided through said passage to restrain a fastener from free fall through said passage and for providing local passage constriction longitudinally movable along the delivery tube in response to a force applied to the fastener head by the plunger for preserving a desired fastener orientation while enabling the fastener to advance and be guided along the delivery tube to the fastening station, said displaceable guide means comprising a plurality of circumferentially-spaced ball bearing assemblies, looped tracks for said ball bearing assemblies, at least portions of said looped tracks being arranged longitudinally along said passage, and a plurality of fastener head contact ball bearings circulating in said tracks.

9. A delivery tube for a fastener application machine for delivering fasteners in succession to a workpiece, the fasteners each having an elongated shank and a relatively enlarged head and the application machine having a drive which includes a fastener application plunger, the delivery tube having an internal longitudinal passage and a displaceable guide means extending substantially along the entire longitudinal extent of said internal passage to reduce its internal diameter over at least part of its internal periphery to form a constriction resulting from an interference fit with the enlarged head of the fastener as the fastener is guided through said passage to restrain the fastener from free-fall through said passage and to provide local passage constriction longitudinally movable along the delivery tube to preserve a desired fastener orientation while the fastener is advanced and guided along the delivery tube to the workpiece in response to a force applied to the fastener head by the plunger.

10. A delivery tube for a fastener application machine for delivering fasteners in succession to a workpiece, the fasteners each having an elongated shank and a relatively enlarged head and the application machine having a drive which includes a fastener application plunger, the delivery tube having an internal longitudinal passage and a displaceable guide means extending substantially along the entire longitudinal extent of said internal passage to reduce its internal diameter over at least part of its internal periphery to form a constriction resulting from an interference fit with the enlarged head of the fastener as the fastener is guided through said passage to restrain the fastener from free-fall through said passage and to provide local passage constriction longitudinally movable along the delivery tube to preserve a desired fastener orientation while the fastener is advanced and guided along the delivery tube to the workpiece in response to a force applied to the fastener head by the plunger, said displaceable guide means comprising a plurality of circumferentially-spaced ball bearing assemblies, looped tracks for said ball bearing assemblies, at least portions of said looped tracks being arranged longitudinally along said passage, and a plurality of fastener head contact ball bearings circulating in said tracks.

* * * * *